United States Patent [19]
McGinty

[11] 4,366,562
[45] Dec. 28, 1982

[54] RODENT REPELLING DEVICE

[76] Inventor: John J. McGinty, 37294 Camp Creek Rd., Springfield, Oreg. 97477

[21] Appl. No.: 236,683

[22] Filed: Feb. 23, 1981

[51] Int. Cl.³ .............................................. H04B 1/02
[52] U.S. Cl. .................................... 367/139; 43/124; 116/22 A
[58] Field of Search ......................... 367/139; 43/124; 116/22 A

[56] References Cited
U.S. PATENT DOCUMENTS
3,517,635  6/1970  Kuhl et al. ........................ 116/22 A

*Primary Examiner*—Theodore M. Blum
*Attorney, Agent, or Firm*—James D. Givnan, Jr.

[57] ABSTRACT

A ground inserted rod supports at its upper end a base having a cup-shaped member in which is loosely received a motor housing. During motor operation an eccentric blade imparts random movement to the motor housing to cause same to impact the cup-shaped member to impart vibratory movement to the ground inserted rod for wave generation. A battery holder provides a self-contained power source such as a low voltage dry cell battery.

4 Claims, 3 Drawing Figures

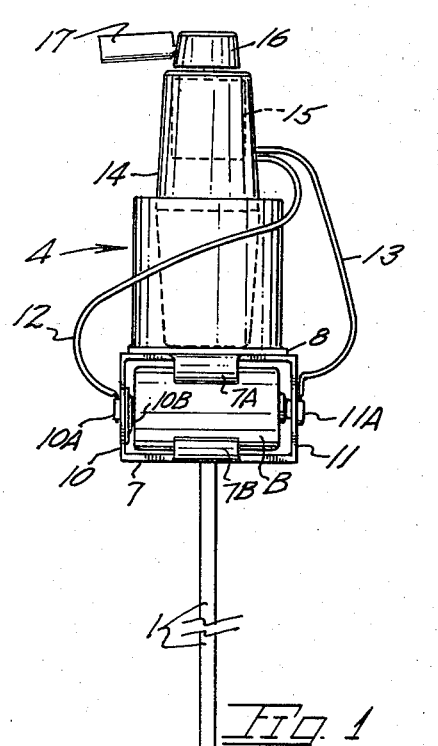
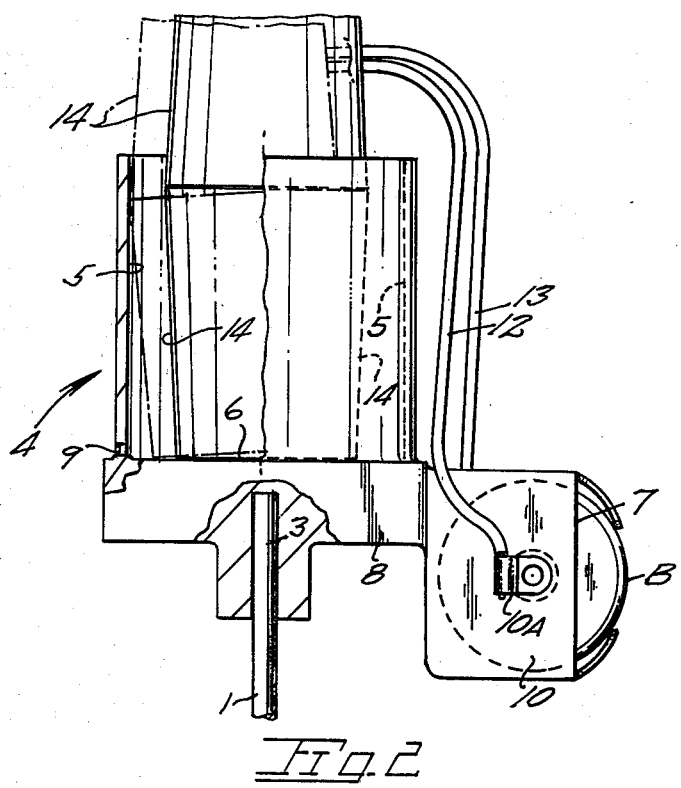
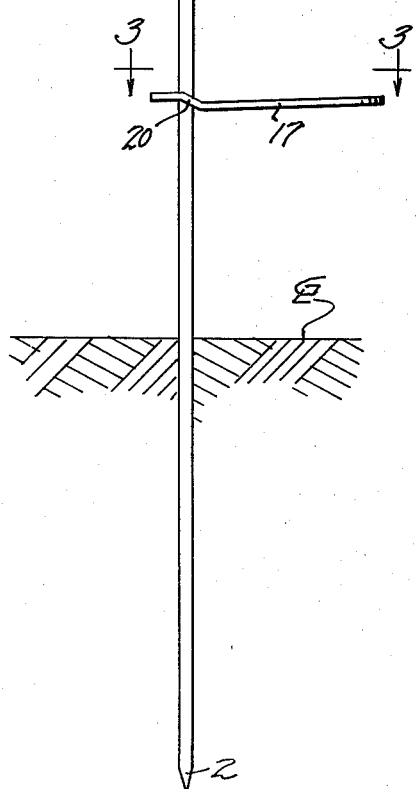
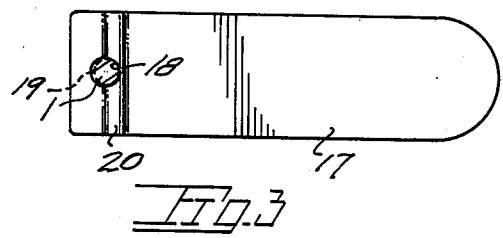

RODENT REPELLING DEVICE

BACKGROUND OF THE INVENTION

The present invention pertains to vibratory devices for imparting sound waves to the ground to deter burrowing rodents, such as moles.

It is known that the propagation of sonic waves has a deterrent effect on rodents. Examples of prior art using sonic wave motion for such purposes are found in U.S. Pat. Nos. 3,093,761; 3,503,039; 3,879,702; 4,163,966 and 4,097,838.

For the most part, the known prior art devices are of costly construction, not battery powered, and do not lend themselves to multiple use in outdoor, unattended sites. The power source most often required by such devices is 110 V which necessitates extension cords from a building electrical outlet. Additionally, such a power source may constitute considerable risk to persons and domestic animals.

SUMMARY OF THE PRESENT INVENTION

The present invention is embodied in a ground inserted device having a self-contained power source and generating ground waves over an extended period to kill or deter burrowing rodents.

The present device utilizes a low voltage motor which drives eccentric means to impart vibratory motion to the motor housing and ultimately to a ground inserted rod supporting the device. A cup member atop the rod and loosely confines the motor housing to permit the latter to move in an erratic manner to forcefully contact the cup sides and base in a vibratory manner. Accordingly, the ground rod is vibrated with wave motion being induced in the ground for a radial range of several feet.

Important objects include the provision of a rodent deterring device which is not dependent on a remote power source and accordingly is usable at any site; the provision of such a device of extremely low manufacturing cost to permit multiple use of same at a low expense to the user and which multiple use greatly enhances the effectiveness of the device; the provision of a device which may be left unattended during operation without fear or injury to human beings or domestic animals; the provision of a device readily insertable into the ground without resorting to other tools; the provision of such a device having a low manufacturing cost and powered by a low cost one and one-half volt dry cell battery; the provision of a device utilizing a motorized component presently available and which is easily modified to provide desired vibratory motion.

BRIEF DESCRIPTION OF THE DRAWING

In the drawing:

FIG. 1 is an elevational view of the device on a reduced scale;

FIG. 2 is an enlarged fragmentary view of the left hand side of the cup member of the device of FIG. 1 and related components; and FIG. 3 is a horizontal sectional view taken along line 3—3 of FIG. 1 and showing a foot actuated step for rod insertion purposes.

DETAILED DESCRIPTION OF THE PREFERRED EMBODIMENT

With continuing attention to the drawing, the reference numeral 1 indicates a rod pointed at its bottom end 2 to facilitate ground penetration. In place on the upper end 3 of the rod is a cup-shaped holder generally at 4 having an inner wall surface 5 and a bottom wall surface 6 on a base portion 8. A drain hole is at 9.

A battery holder at 7 is supported by holder 4 and includes end walls 10 and 11, each provided with a terminal at 10A and 11A in circuit with electrical leads 12 and 13. The terminals are of the yieldable clip type to facilitate installation and removal of lead ends. A dry cell battery at B is rated at one and one-half V. A spiral spring 10B on one terminal facilitates battery removal as do flexible ears 7A-7B.

A double tapered motor housing at 14 is of elongate shape and apertured to receive electrical leads 12 and 13 which terminate at a motor 15 suitable secured within the upper exposed portion of the housing. A motor output shaft is fitted with a spinner 16 of an asymmetrical nature. A blade at 17 extends from spinner 16 and is preferably shaped as an airfoil. During spinner rotation at high speed dynamic forces act on the spinner and hence housing 14 to impart random or erratic vibratory motion to same causing the housing 14 to impact inner wall 5 of the cup member. Additionally, a vertical component of motor housing movement causes same to act on the bottom wall surface 6 of the base to impart additional motion thereto and specifically rod 1. In use motor housing 14 "dances" about surface 6 in a vibratory manner to impact cup inner wall surface 5.

Installation of rod 1 is easily accomplished in most any ground, soft or hard, by use of a step 17 which is apertured at 18 to engage a notch 19 cut in the rod. An angulated segment at 20 of the step assures desired horizontal step-to-rod engagement.

In use, the vibrating rod imparts wave motion to the earthen material with wave motion propagated primarily along horizontal vectors. Burrowing rodents such as moles are handicapped by such ground waves in that their motion sensing capabilities are hindered. Since moles locate their primary food source earthworms by means of detecting wave motion generated by the earthworms the overriding rod generated waves nullify those of an earthworm to render the mole incapable of finding the food source. After a foodless period of eleven hours or so the mole dies from starvation. The extremely low amperage draw of the motor permits continuous motor operation on one battery for at least eleven hours. In multiple use, spaced equally at ten feet or so such imparts sound waves to a sizeable ground area.

A suitable embodiment of the invention uses a rod thirty inches or so long, a cup member of rigid plastic and a motor housing widely sold off-the-shelf as part of a miniature hand held fan motor housing. One blade of the fan is removed while the remaining blade is truncated to provide a blade stub of about one inch length. Motor 15 has a rating of 375 milliamps and operates within a voltage range of 1½ V to 0.7 V. Holder 4 is approximately two inches in length with a diameter to provide about one quarter inch spacing about motor housing 14.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

I claim:

1. A rodent deterring device for generating constant sonic waves over a period of several hours, said device/comprising,
   a rod for inserted ground engagement,
   a base including a cup-shaped member thereon,
   a motor assembly including a motor housing loosely confined within said cup-shaped member, a motor in circuit with a power source/and having an output shaft, eccentric means on said shaft imparting erratic motion to the motor housing during motor operation, and
   said motor housing forcefully contacting the cup-shaped member during motor operation to impart vibratory motion to the rod for generating sound waves in the ground.

2. The device claimed in claim 1 wherein said base additionally includes a battery holder and flexible electrical leads in circuit with said motor and with a battery power source in said holder.

3. The device claimed in claim 2 wherein said eccentric means is a blade having an aerodynamic shape to contribute to the erratic motion of the motor housing.

4. The device claimed in claim 1 additionally including a step engageable with said rod for ground insertion purposes.

* * * * *